Figure 1:
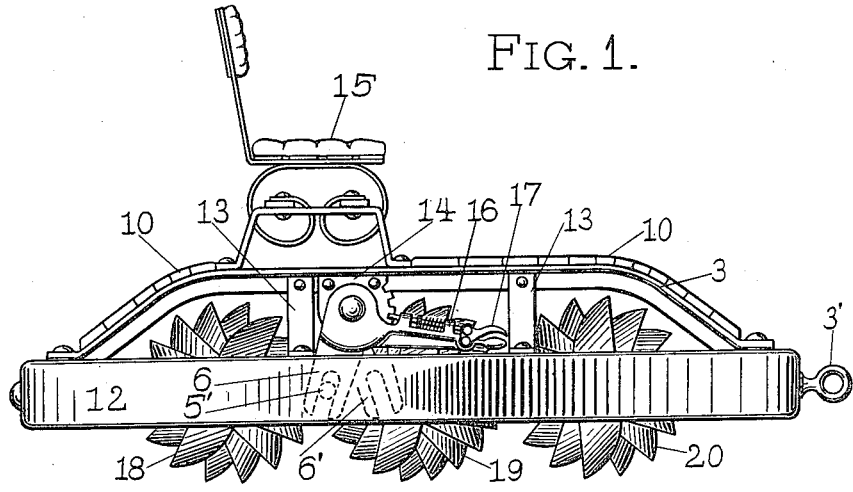

J. A. BACKLUND.
HARROW.
APPLICATION FILED OCT. 4, 1916.

1,213,998.

Patented Jan. 30, 1917.
2 SHEETS—SHEET 1.

WITNESSES:
C. F. Wm. Forssberg.
Hilda C. E. Forssberg

Josef Anders Backlund INVENTOR.

BY Frank Carlson ATTORNEY

J. A. BACKLUND.
HARROW.
APPLICATION FILED OCT. 4, 1916.

1,213,998.

Patented Jan. 30, 1917.
2 SHEETS—SHEET 2.

WITNESSES:
C. F. Wm. Forssberg.
Hilda C. E. Forssberg

Josef Anders Backlund INVENTOR.

BY
Frank Carlson
ATTORNEY

UNITED STATES PATENT OFFICE.

JOSEF ANDERS BACKLUND, OF BROOKLYN, NEW YORK.

HARROW.

1,213,998. Specification of Letters Patent. Patented Jan. 30, 1917.

Application filed October 4, 1916. Serial No. 123,733.

*To all whom it may concern:*

Be it known that I, JOSEF ANDERS BACKLUND, a subject of the Czar of Russia, residing at 561 Thirty-ninth street, in the borough of Brooklyn, county of Kings, city and State of New York, have invented certain new and useful Improvements in Harrows, of which the following is a specification.

This invention relates to rotary harrows, and especially to that class wherein the earth engaging elements are secured to a plurality of parallel shafts which remain parallel in any adjustment or oblique position.

One object of this invention is to provide a rotary harrow having the blades on each shaft arranged in progressive advancement from one end of the shaft to the other.

Another object of this invention is to provide a harrow whose shafts remain parallel however differently the shafts are adjusted in relation to the harrow frame.

Another object of this invention is to provide a harrow frame with interiorly channeled sides housing a pair of opposed strips carrying corresponding bearings.

Other objects and possibilities will become apparent as the specification proceeds.

The invention embodies the especial features herein described, illustrated in the drawings and specifically pointed out in the claims.

In the drawings like ordinals refer to like parts.

Figure 2:
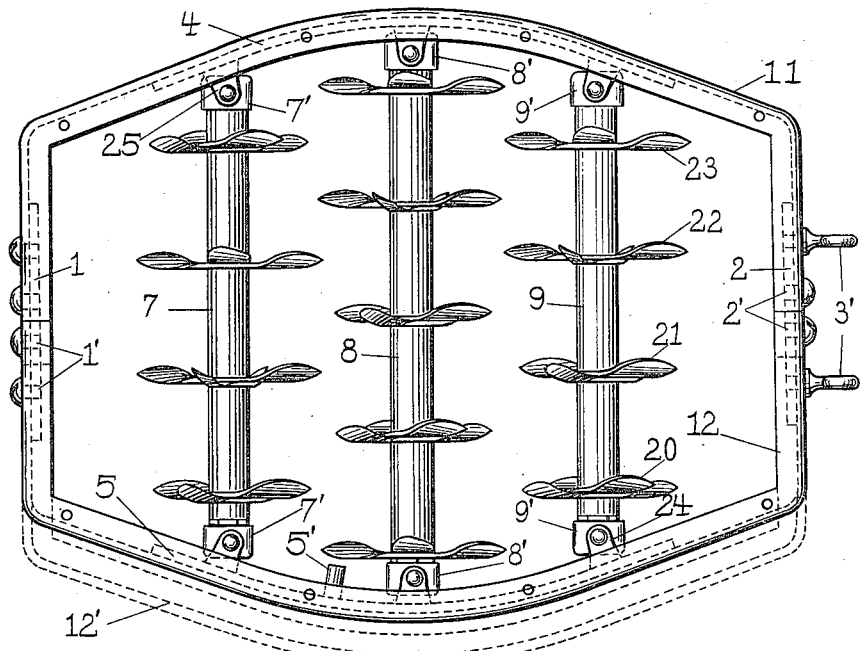
Figure 3:
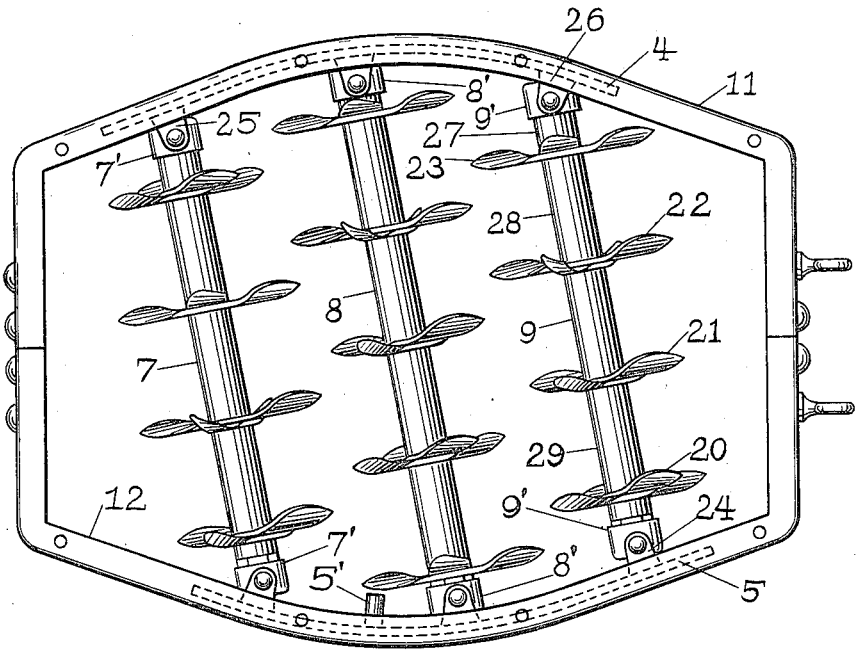
Figure 4:
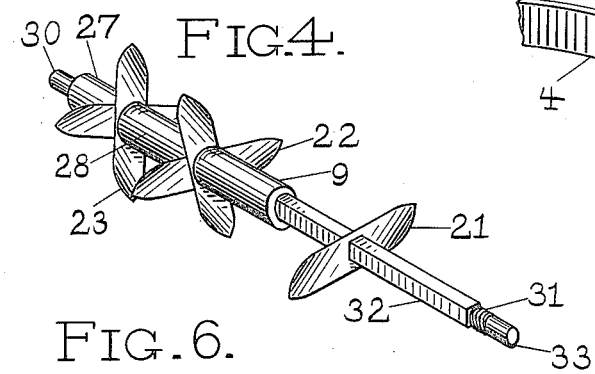
Figure 5:
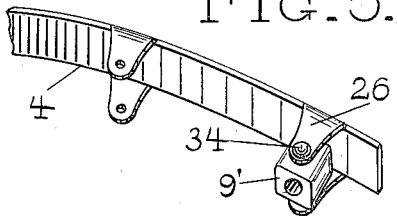
Figure 6:
Figure 7:
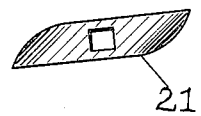

Figure 1 is a side elevation of an apparatus embodying the present invention. Fig. 2 is a top view of Fig. 1, with the superstructure 3, 13, 13 entirely removed. Fig. 3 is a similar view with modifications. Fig. 4 is a fragmentary view of strip 4 of Fig. 3. Fig. 5 is a view of shaft 9 of Fig. 3 partially assembled. Fig. 6 is a tube belonging to Fig. 4. Fig. 7 is a blade belonging to Fig. 4.

In rotary harrows which are entirely supported by the earth engaging blades, it has been found very awkward to have the corresponding blades in line on any one shaft as the whole apparatus bobs up and down when rising and falling as it were on distant crests or points. It is here proposed to remedy this by securing the blades in such manner as to present only one blade at a time for a given shaft, as 18, 19 or 20 in Fig. 1. This progressive advancement of the blades is differently shown in Fig. 2 where 20, 21, 22 and 23 on shaft 9 are the blades, this arrangement presenting at least one blade to the ground for any position of a given shaft.

In Figs. 1 and 2, 3' are the drawing hooks. In Fig. 1 the frame 12 supports the beam 3, braced by strips 13, 13. The board cover is denoted 10, 10, and the seat 15.

The frame 12, more fully shown in Fig. 2 with part 11, is of channel iron, and is secured within the ends by strips 1 and 2. Strips 4 and 5 lie within the channels of 11 and 12, and have several bent parts like 24 and 25 in which are swivel bearings 7', 7', 8', 8', 9' and 9'. In Fig. 5 an especial view of this feature is shown. The shafts 7, 8 and 9 by their length retain strips 4 and 5 in place, but by unscrewing 1', 2' and 3', the part 12 will easily be drawn away from 11 as at 12', permitting the strips 4 and 5 to drop out of the frame. If then strip 4 is drawn away from 5, the shafts 7, 8 and 9 will be entirely disengaged.

In Fig. 1 it will be noted that a lock plate 14 is secured to beam 3, and an adjusting lever 16 pivoted on the same plate. The lever arm 16 has an inward downward fork 6 straddling stud 5', shown also in Fig. 2. When release lever 17 is pressed while raising lever 16, the fork 6 will be moved to a position denoted 6'. This will move stud 5' from the position of Fig. 2 into that shown in Fig. 3, causing strips 4 and 5 to slide in a partially rotary manner about the theoretical center of the apparatus. The shafts 7, 8 and 9 will then assume the positions in Fig. 3. Of course, intermediate positions are possible, depending upon the spacing of the teeth on plate 14 of Fig. 1.

As direct points and perfectly straight blades are not as efficient as curved blades, the especial curvatures which have been found useful are seen in Fig. 1, showing the profile shape; and in Figs. 2, 3, 4 and 7 where the bend in each blade is shown. In Fig. 4, shaft 9 is seen partly assembled. The square shaft 32 has a round end 30 which fits in 9' of Fig. 5 and the other round end 33 goes in journal 9' of strip 5 in Fig. 3. Tube 27 is secured in position by a pin or other means, and blades 23 slipped on as blade 21. Then tube 28 is slipped on, and blades 22 also. Proceeding thus with tube 9, blades 21 of Fig. 7, then tube 29 of Fig. 6, then one more pair of blades. Then the collar below 20 in Fig. 3 is slipped on and a nut is screwed on the thread 31 shown in Fig. 4. This shaft is then complete and ready to set into the frame.

It will be noticed that the shaft 32 is square as well as the holes in the blades, as in Figs. 4 and 7. These holes are slightly rotated in any one pair of blades compared with the adjacent pairs on the same shaft, otherwise all blades are duplicates exteriorly.

In Fig. 5 journal 9' is illustrated in position between lips 26 of strip 4, the pin 34 holding it in position to swivel.

The convenience in disassembling and assembling the apparatus is especially intended to facilitate resharpening the points of the blades.

Having thus fully described my invention, what I claim as new and desire to obtain by Letters Patent is:

1. A harrow comprising a frame, a plurality of shafts bearing earth engaging blades mounted in bearings slidably supported within said frame, and means for adjusting the bearings on either side of said frame in opposite directions and retaining said bearings in different positions in relation to the frame while maintaining said shafts parallel in all positions.

2. A harrow comprising a frame, a plurality of rotor shafts fitted in bearings which are secured to oppositely situated strips slidably supported in said frame, and a lever for shifting said strips linearly in opposite directions and locking them in any attained position.

3. A harrow comprising a frame having a pair of opposite sides interiorly channeled, a strip lying in each channel, and a plurality of facing and correspondent bearings pivotally secured to said strips to permit the strips to slide in their respective channels, said strips being retained in the channels by rotor shafts inserted in said bearings, and a lever attached to one strip whereby both strips may be slid into and retained in any position in the channels, substantially as described.

4. A harrow comprising an interiorly channeled frame, a pair of slidable strips located in opposite channels, corresponding swivel bearings on the inner exposed surfaces of said strips, and a plurality of rotor shafts extending from the bearings in one strip into the corresponding bearings on the other strip the movement of one strip causing a compensating movement of the other in the opposite direction.

5. A harrow comprising an interiorly channeled frame having strips provided with bearings in opposite channels, and shafts provided with earth engaging blades connecting the bearings on one of said strips with the bearings on the other strip, a pin on one of said strips and a notched plate secured to said frame, and an adjusting lever pivoted on said toothed plate with releasable means for engaging teeth in said plate, said adjusting lever having a downwardly extending fork straddling aforesaid pin on said strip, providing means for reciprocating and securing said strip in position, substantially as described.

6. A harrow comprising an interiorly channeled frame with strips in the channels, said strips being each provided with a series of horizontally swiveling bearings, a pair of tongues extending from the strip above and below each bearing and a pair of pins located in vertical alinement one in each said tongue and partly into the included bearing, substantially as described.

7. A harrow comprising a frame supporting a pair of opposite strips provided with bearings, and rotor shafts in said bearings connecting said strips, said frame being separable at either end, providing for the disengagement and withdrawal of said strips and shafts, substantially as described.

8. A harrow comprising a frame interiorly supporting a pair of oppositely located slidable strips provided with bearings, and rotor shafts in the bearings connecting said strips, an outwardly bowed formation of the strip supporting sides providing for a partial rotary movement of said strips about the theoretic center of said frame, substantially as described.

Signed at 132 Nassau street, in the borough of Manhattan, county of New York, city and State of New York, this 2nd day of October, A. D. 1916.

JOSEF ANDERS BACKLUND.

Witnesses:
HILDA C. E. FORSSBERG,
OLOF F. FORSSBERG.